(12) United States Patent
Tanaka et al.

(10) Patent No.: US 7,467,678 B2
(45) Date of Patent: Dec. 23, 2008

(54) HYBRID FOUR-WHEEL-DRIVE

(75) Inventors: Daiki Tanaka, Yokosuka (JP); Jun Sugihara, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 342 days.

(21) Appl. No.: 11/268,769

(22) Filed: Nov. 7, 2005

(65) Prior Publication Data
US 2006/0108166 A1 May 25, 2006

(30) Foreign Application Priority Data
Nov. 8, 2004 (JP) .............................. 2004-323400

(51) Int. Cl.
B60K 6/00 (2007.10)
B60K 17/344 (2006.01)
B60W 10/04 (2006.01)

(52) U.S. Cl. .................... 180/65.2; 180/248; 477/35

(58) Field of Classification Search .............. 475/1, 475/5, 174, 224, 223; 701/69; 180/248, 180/65.2; 477/35
See application file for complete search history.

(56) References Cited

U.S. PATENT DOCUMENTS

| | | | | |
|---|---|---|---|---|
| 3,976,154 | A * | 8/1976 | Clark et al. ............... | 180/24.05 |
| 5,030,182 | A * | 7/1991 | Frost ........................ | 475/204 |
| 6,383,114 | B1 * | 5/2002 | Hoshiya et al. ............. | 477/2 |
| 6,449,552 | B2 * | 9/2002 | Ohba et al. ................. | 701/89 |
| 6,549,840 | B1 * | 4/2003 | Mikami et al. ............. | 701/69 |
| 6,569,055 | B2 * | 5/2003 | Urasawa et al. ............ | 477/5 |
| 6,629,026 | B1 | 9/2003 | Baraszu et al. | |
| 6,685,591 | B2 * | 2/2004 | Hanyu et al. ............... | 475/5 |
| 6,852,053 | B2 | 2/2005 | Nakano et al. | |
| 7,000,717 | B2 * | 2/2006 | Ai et al. .................... | 180/65.2 |
| 7,097,586 | B2 * | 8/2006 | Joe et al. .................... | 477/3 |
| 7,140,461 | B2 * | 11/2006 | Morrow ..................... | 180/65.2 |
| 7,217,212 | B2 * | 5/2007 | Fanselow et al. ........... | 475/174 |
| 2002/0036106 | A1 * | 3/2002 | Hanyu et al. ............... | 180/65.2 |
| 2003/0024753 | A1 * | 2/2003 | Maruyama et al. .......... | 180/248 |
| 2003/0181276 | A1 * | 9/2003 | Minagawa et al. ........... | 475/5 |
| 2003/0205422 | A1 * | 11/2003 | Morrow et al. ............. | 180/65.2 |
| 2003/0232682 | A1 * | 12/2003 | Rogers et al. .............. | 475/221 |
| 2004/0077448 | A1 * | 4/2004 | Oshidari et al. ............. | 475/5 |
| 2004/0149501 | A1 * | 8/2004 | Imazu et al. ............... | 180/65.2 |
| 2004/0256165 | A1 * | 12/2004 | Tomita et al. .............. | 180/65.2 |
| 2005/0107199 | A1 * | 5/2005 | Minagawa ................... | 475/5 |
| 2005/0107207 | A1 * | 5/2005 | Imazu et al. ................ | 477/35 |

(Continued)

FOREIGN PATENT DOCUMENTS

JP 63097433 A * 4/1988

(Continued)

*Primary Examiner*—Lesley D. Morris
*Assistant Examiner*—Daniel Yeagley
(74) *Attorney, Agent, or Firm*—Global IP Counselors, LLP

(57) ABSTRACT

A four-wheel drive system for a hybrid vehicle includes at least two motor-generators and a single engine connected to a differential having multiple degrees of freedom. In some embodiments, by adjusting the outputs of the motor-generators, a controller allocates power from the engine, to or from each of the motor-generators, to the front wheels and to the rear wheels, each of which is connected to an element of the differential. The relationship between the elements of the differential is represented by an alignment chart of the differential.

23 Claims, 12 Drawing Sheets

U.S. PATENT DOCUMENTS

| | | | |
|---|---|---|---|
| 2005/0247503 A1* | 11/2005 | Imazu | 180/300 |
| 2006/0063629 A1* | 3/2006 | Minagawa et al. | 475/5 |
| 2006/0247081 A1* | 11/2006 | Yamauchi et al. | 475/1 |
| 2006/0276289 A1* | 12/2006 | Hirata et al. | 475/5 |

FOREIGN PATENT DOCUMENTS

| | | | |
|---|---|---|---|
| JP | 04339026 A * | 11/1992 | |
| JP | H05-91953 U | 12/1993 | |
| JP | 06-107005 | 4/1994 | |
| JP | 08-042656 | 2/1996 | |
| JP | 08-282314 | 10/1996 | |
| JP | 11-240347 | 9/1999 | |
| JP | 11-332021 | 11/1999 | |
| JP | 2001-260684 A | 9/2001 | |
| JP | 2003-032802 A | 1/2003 | |
| JP | 2003-034153 | 2/2003 | |
| JP | 2003-034155 A | 2/2003 | |
| JP | 2003-237394 | 8/2003 | |
| JP | 2003-291671 A | 10/2003 | |
| JP | 2003-335143 A | 11/2003 | |
| JP | 2004147491 A * | 5/2004 | |
| JP | 2005-029118 A | 2/2005 | |
| JP | 2005-145334 A | 6/2005 | |
| JP | 2005-170159 A | 6/2005 | |
| TW | 217397 A * | 12/1993 | |

* cited by examiner

T1 = T2 = 0
Fr Torque = 0
Rr Torque = Eng Torque

T1 < T2
Fr Torque > Rr Torque

T1 > T2
Rr Torque > Fr Torque

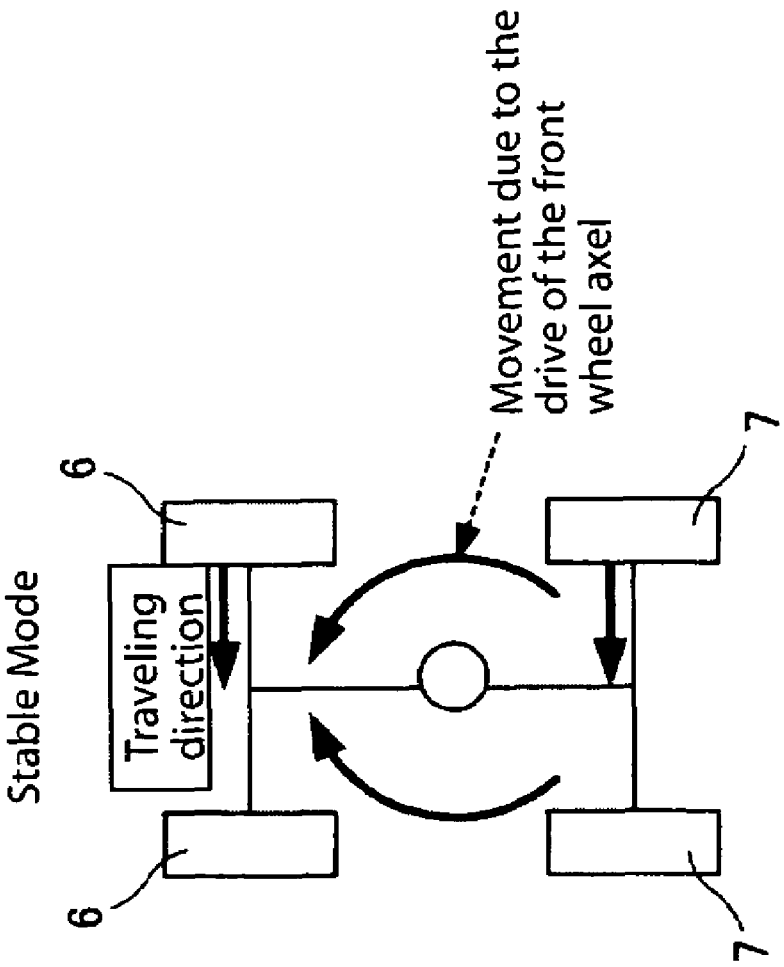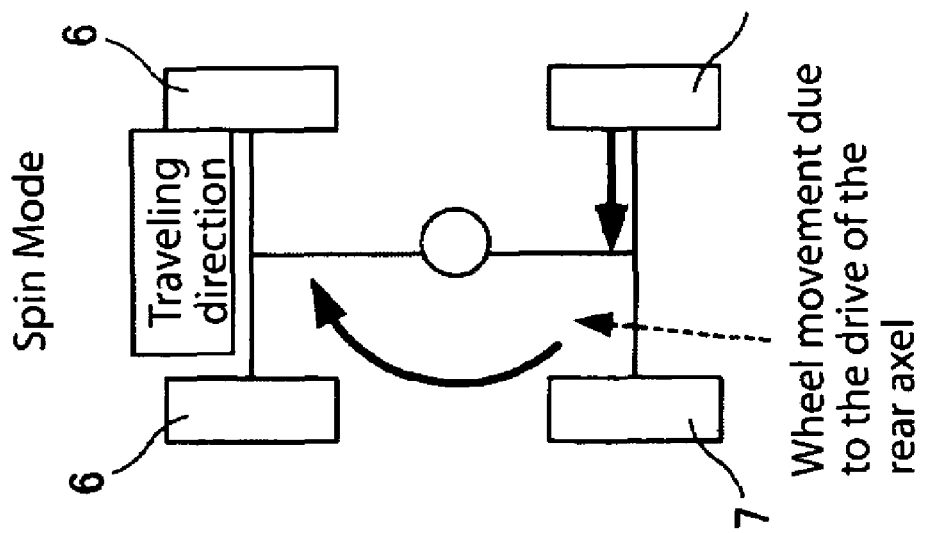

HYBRID FOUR-WHEEL-DRIVE

This application claims priority from Japanese Patent Application No. 2004-323400, filed Nov. 8, 2004, the entire disclosure of which is hereby incorporated herein by reference.

TECHNICAL FIELD

The invention relates to a drivetrain for a hybrid vehicle with four-wheel-drive.

BACKGROUND

In some hybrid four-wheel-drive systems, driving force for one of the front or rear wheels is provided from an engine and driving force for the other of the front and the rear wheels is provided from an electric motor.

For example, a vehicle may have the engine and a generator in the front and drive the front wheels with driving force of the engine. Furthermore, the vehicle may have a motor in the rear and drive a rear wheels with driving force of the motor. Because the rear wheels are powered only by a motor, the motor must be large.

For example, other four-wheel-drive vehicles may have the engine in the front and a transaxle system powertrain with the transmission placed in the rear, near the rear axle. In this configuration, engine power passes through the driveshaft into the transmission, which is integrated with the rear final reducer, passing through the rear final reducer from the gearshift output to drive the rear-wheel driveshaft. The gearshift output again passes through the driveshaft into the front final reducer to drive the front-wheel driveshaft. Generally, the transmission in the rear of the vehicle increases weight on the rear axle, raising the slip threshold of the rear wheels, which are the drive wheels, and increasing the driving force on the road surface.

However, if the four-wheel-drive vehicle is equipped with a regular transfer case for rear-wheel drive, driving force distribution controllability is limited due to distribution of torque from the engine, the torque first going to the rear axle, then to the front-wheel driveshaft. Therefore it is difficult to distribute a greater driving force to the front wheel than to the rear wheel.

Therefore, in consideration of the above-mentioned problems, the purpose of this invention is to provide a hybrid four-wheel-drive system with increased controllability of the driving force distribution to the front and rear wheels.

SUMMARY

A four-wheel drive system for a hybrid vehicle includes at least two motor-generators and a single engine connected to a differential having multiple degrees of freedom. In some embodiments, by adjusting the outputs of the motor-generators a controller allocates power from the engine, to or from each of the motor-generators, to the front wheels and to the rear wheels, each of which is connected to an element of the differential. The relationship between the elements of the differential can be represented by an alignment chart of the differential.

In one embodiment, a drivetrain for a vehicle comprises a first driveline system that includes one of front wheels or rear wheels, a second driveline system that includes the other of the front wheels and the rear wheels, a differential gear mechanism and a controller to adjust power outputs to the first driveline system and the second driveline system. The differential gear mechanism includes a first rotational element that receives power from an engine and outputs power to the first driveline system, a second rotational element that inputs power from a first motor-generator, and a third rotational element that inputs power from a second motor-generator. A rotational element of the differential gear mechanism other than the first rotational element outputs power to the second driveline system.

In an embodiment, a hybrid four-wheel-drive system comprises a front driveline system, a rear driveline system, a differential gear having at least two degrees of freedom, and a means for controlling power input from the engine, the power output for the rear driveline system and the power output for the front driveline system. The differential gear includes a power input from an engine, a power output for the rear driveline system, a power output for the front driveline system, a power input for a first motor generator and a power input for a second motor generator.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 6 is a diagram to show the behavior status (A), (B) of a vehicle during cornering.

DETAILED DESCRIPTION

Figure 1:
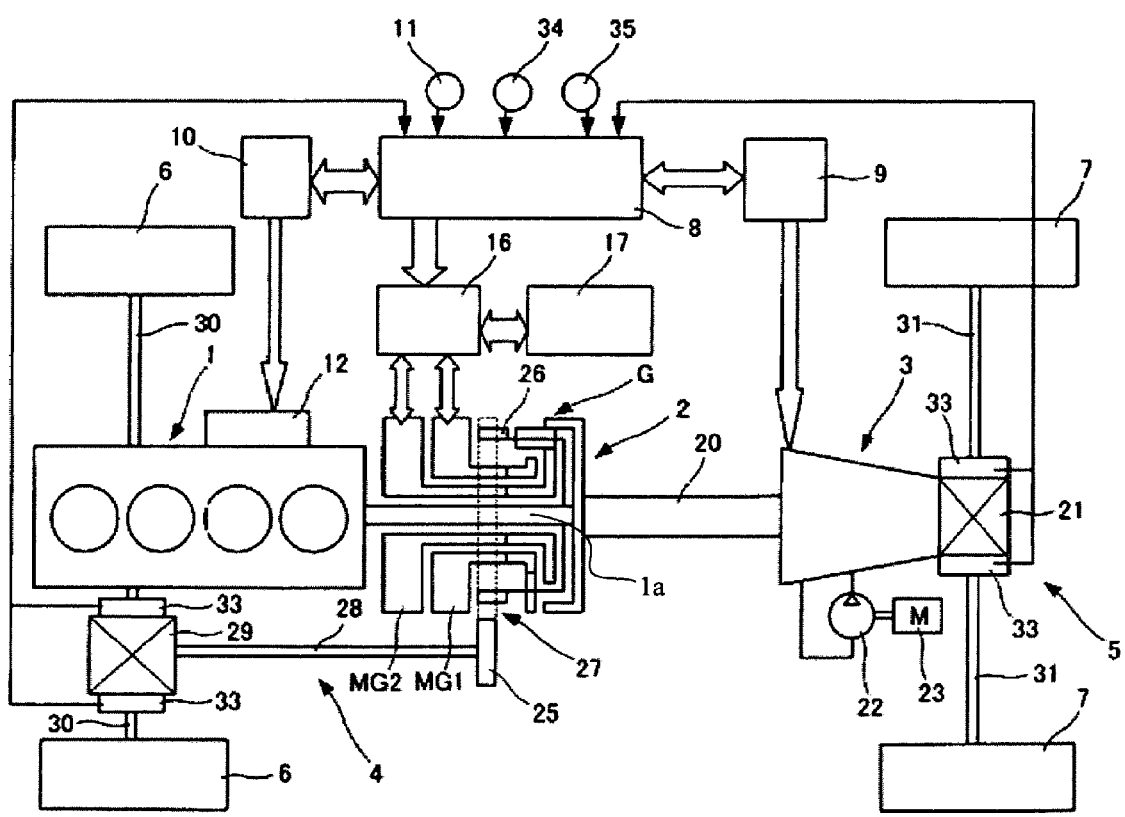
FIG. 1 is a system block diagram of a hybrid four-wheel-drive system relating to a first exemplary embodiment of the present invention.

Below, the hybrid four-wheel-drive system of this invention is described based on various exemplary embodiments. FIG. 1 is a block diagram of the first exemplary embodiment of a hybrid four-wheel-drive system in which this invention is applied.

In FIG. 1, a hybrid four-wheel-drive system includes three or more output elements, with these elements input from the engine 1 and output to the front-wheel-drive system 4; a differential gear 2 allocating to two or more motor-generators; a transmission 3 that outputs the gearshift to the rear-wheel-drive system 5, inputting the driving force of the engine 1 from engine output shaft 1a without being routed through the differential gear 2; a front-wheel-drive system 4 that transmits the driving force output from the differential gear 2 to the front wheels 6 of the vehicle; and a rear-wheel-drive system 5 that transmits the driving force output from the transmission 3 to the rear wheels 7 of the vehicle. Furthermore, the four-wheel drive system includes a main controller 8 that controls the differential gear 2, a gearshift controller 9 that controls the transmission 3, and an engine controller 10 that controls the engine torque in addition to starting and stopping the engine 1, and these controllers 8-10 mutually connect the buses. The engine controller 10 controls the engine torque through the actuator 12, which controls the throttle pump in response to pressing down on the accelerator pedal 11.

Figure 2:
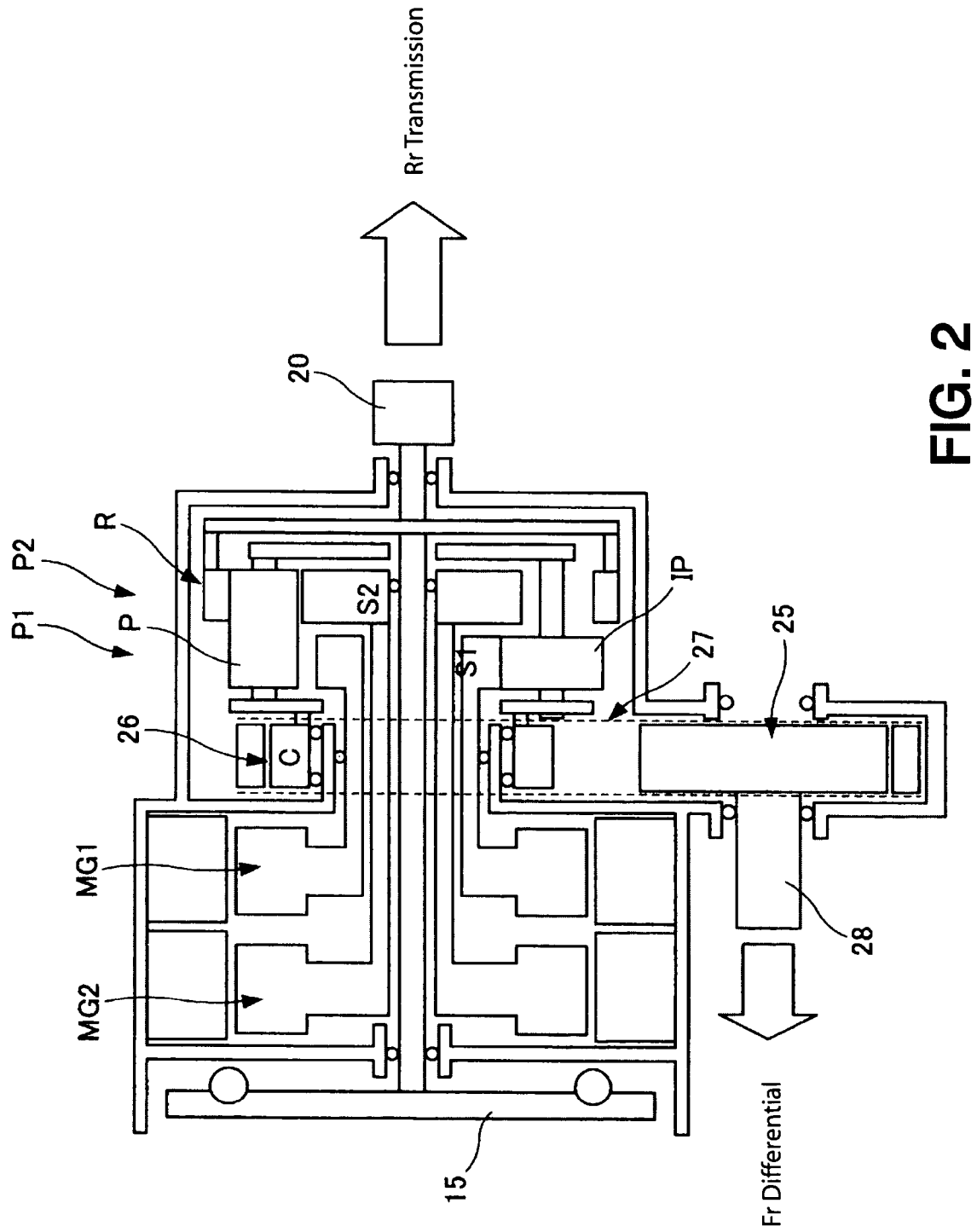
FIG. 2 is a block diagram of a differential gear of the present invention.
Figure 3:
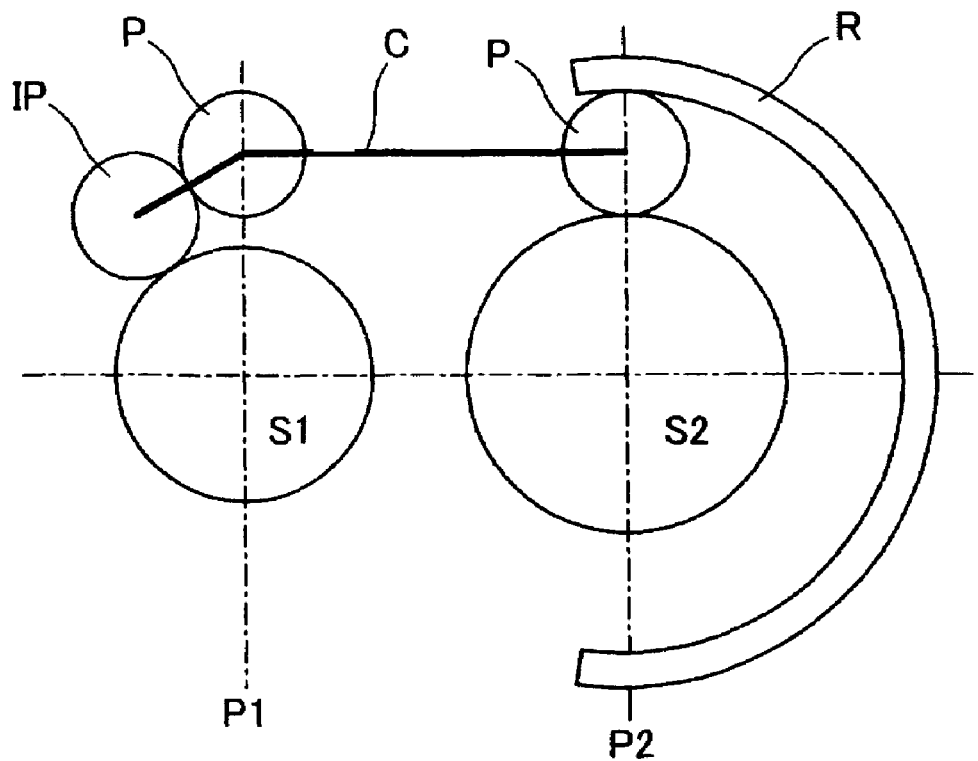
FIG. 3 is a conceptual drawing of a differential planetary gear assembly of a differential gear.

As shown in detail in FIG. 2, the differential gear 2 includes two or more motor-generators MG1, MG2, and a differential planetary gear assembly G able to variably control the drive output to the front-wheel-drive system 4 and/or rear-wheel-drive system 5 in response to the driving force from the engine 1 and driving force of the motor-generators MG1, MG2. The differential planetary gear assembly G shares a ring gear R and carrier C. The differential planetary gear assembly G uses a Ravigneaux differential planetary gear assembly made from first and second planetary gear lines P1, P2, which includes a planetary gear and a sun gear with different diameters. As shown in the expanded FIG. 3, the double-pinion first planetary gear line P1 includes a sun gear S1, an idler pinion IP that meshes with the sun gear S1 as well as a pinion P that meshes with the idler pinion IP as well as with the ring gear R of the second planetary gear line P2, and the single-pinion second planetary gear line P2 includes a sun gear S2 that meshes with the pinion P. Sun gear S1 has a smaller diameter than sun gear S2. The hybrid unit, comprising this kind of differential planetary gear assembly G and motor-generators MG1, MG2, performs diversion of the hybrid unit for front-wheel-drive vehicles.

The differential planetary gear assembly G inputs driving force from the engine 1 to the ring gear R, passing through the clutch mechanism 15, and inputs the driving force of the motor-generator MG1 to the small-diameter sun gear S1, and inputs the driving force of the motor-generator MG2 to the large-diameter sun gear S2. The sun gear S1, which is driven by the motor-generator MG1, generates driving force from the engine 1, passing through the double-pinion gear, to the carrier C due to the differential with the rotating ring gear R. The sun gear S2, which is driven by the motor-generator MG2, generates driving force to the carrier C through the differential with the ring gear R. Accordingly, the final driving force of the carrier C is determined by the balance of three driving forces from the engine 1, the motor-generator MG1, and motor-generator MG2. The motor-generators MG1, MG2 are electronically connected to the battery 17 via the inverter 16, and by controlling the inverter 16 by the main controller 8, the drive is controlled by the power supplied by the battery 17, and regenerated power passes through the inverter 16 and is stored in the battery 17.

Figure 4:
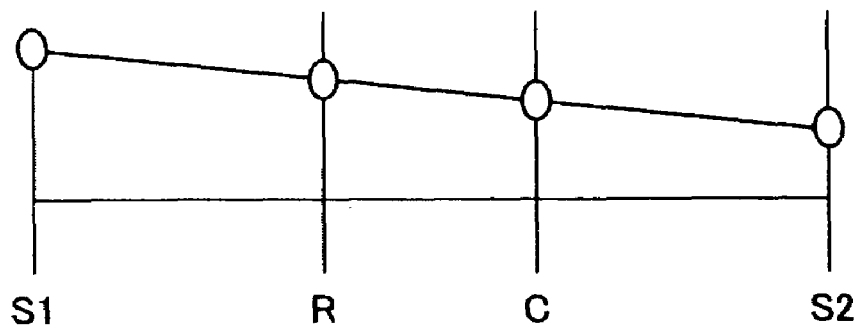
FIG. 4 is an alignment chart of a differential gear.

FIG. 4 shows an alignment chart of the differential planetary gear assembly G forming the first planetary gear line P1. A planetary gear line represents two degrees of freedom among the elements of the line. An alignment chart represents the physical input output relationship between the elements given the two degrees of freedom. For example, the alignment chart of FIG. 4 illustrates that if the position of any two elements on the chart is known, the position of the other two elements can be determined. This relationship is described in more detail below.

The differential planetary gear assembly G includes a double-pinion gear with a sun gear S1, ring gear R, and carrier C. The differential planetary gear assembly G also forms the second planetary gear line P2, which is a single-pinion gear with a sun gear S2, carrier C, and ring gear R. The carrier C and ring gear R have a relationship in which the first planetary gear line P1 and second planetary gear line P2 are shared. In addition, the distance between the sun gear S1, ring gear R, carrier C, and sun gear S2 is set by the gear ratio of the first planetary gear line P1 and second planetary gear line P2. Moreover, the balance of the revolutions and direction of rotation of each element has a relationship in which the revolutions of the four elements are necessarily linked in a straight line, as shown in the diagram. The straight line is one in which, if the revolutions of any two elements is determined, the revolutions of the remaining elements, or in other words the revolutions of all of the elements are primarily determined. Furthermore, for the differential gear 2, when the torque of each element is substituted with a force that works in collinear action, it has the properties of maintaining a rigid equilibrium in collinear action.

The transmission 3 shifts the driving force of the engine 1 input through the driveshaft 20 linked to the ring gear R of the differential gear 2 and outputs that driving force to the rear-wheel-drive system 5. This transmission 3 is comprised of the rear-wheel-drive unit of a transaxle system that is integrated with a rear final reducer 21 comprising a rear-wheel-drive system 5. The transmission 3 may be an infinitely variable transmission able to shift without steps or a step transmission that shifts in steps. The gear ratio is comprised to be automatically set by a transmission controller 9 based on shift patterns set beforehand according to vehicle speed and accelerator depression. The transmission controller 9 connects the main controller 8 to the bus. Furthermore, transmission 3 is composed of an oil pump that is driven by a driveshaft 20 to generate operational oil pressure. As shown in FIG. 1, this oil pump 22 may also be driven by an electric motor 23 without being driven by a driveshaft 20.

The front-wheel-drive system 4 transmits the driving force output from the carrier C of the differential gear 2 to the front wheels 6 of the vehicle, and consists of a belt or chain transmission gear 27 that is wrapped around and engaged with a sprocket 26 composed of a carrier C, differential gear 2, and sprocket 25 for front-wheel drive placed adjacent to the differential gear 2; a front final reducer 29 linked through the front-wheel driveshaft 28 to the sprocket 25 for front-wheel drive as well as a front differential gear with a built-in front final reducer 29; and a driveshaft 30 that transmits the left and right output of this front differential gear to the left and right front wheels 6.

The rear-wheel-drive system 5 transmits the driving force output from the transmission 3 to the rear wheels 7 of the vehicle and consists of a rear final reducer 21 driven by the output of the transmission 3 as well as a rear differential gear with a built-in rear final reducer 21 in addition to a driveshaft 31 that transmits left and right output of this rear differential gear to each left and right rear wheel 7. Moreover, the final rear reducer 21 is composed of a transaxle integrated with the transmission 3. In this case, aft (transmission 3, rear final reducer 21, rear differential, driveshaft 31, platform configuration) from the driveshaft 20, it is possible to divert to the rear-wheel-drive unit of a conventional transaxle system.

Input into the main controller 8 are the detection signal from the rotation speed sensor 33 that detects the speed of rotation of the aft and forward, left and right driveshafts 30, 31, the accelerator pedal depression signal from the accelerator pedal depression sensor 11, the brake signal from pressing down on the brake pedal 34, the SOC (state of charge) signal from the battery 17, and the forward and aft acceleration signal as well as left and right acceleration signal from the G-force sensor 35. The main controller 8 controls the inverter 16 of the motor-generators MG1, MG2 and outputs commands that the engine controller 10 and gearshift controller 9 require.

Actions of the four-wheel drive system of the construction above are described below.

When driving without the motor-generators MG1, MG2 generating driving force and traveling only by the driving force of the engine 1, the driving force input from the engine 1 through the driveshaft 20 to the transmission 3 is amplified or reduced by the transmission 3 and drives the driveshaft 31 for the rear wheels 7 through the rear differential gear. In other words, because all engine driving force drives the rear wheels 7, it acts similar to a conventional transaxle rear-wheel-drive vehicle.

Figure 5A:
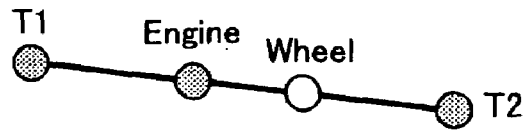
FIG. 5 is a diagram to be used to explain the operation status (A)-(C) of a differential gear based on its alignment chart.

The ring gear R of the differential gear 2 rotates at the same speed as the driveshaft 20, and the carrier C of the differential gear 2 rotates at the number of revolutions multiplied by the inherent gear ratio on the front-wheel-drive system 4 to the number of revolutions of the driveshaft 30 for the front wheels 6 (see FIG. 5A). The sun gears S1, S2 rotate freely at the number of revolutions above the straight line on the alignment chart, which is determined by the number of revolutions of the ring gear R and carrier C. In other words, because the sun gears S1, S2 do not generate the driving force from the motor-generators MG1, MG2, the driving force is not conveyed to the carrier C, or in other words, the front wheels 6. Furthermore, the motor-generators MG1, MG2 do not require a driving force to maintain the change gear ratio.

Next, a case in which the motor-generators MG1, MG2 generate the driving force is described. When the driving force begins to slip beyond the slip threshold of the rear wheel tires 7 in conditions in which the rear-wheel-drive system 5 is driven by the driving force of the engine 1, a difference arises in the revolutions of the front wheels 6 and rear wheels 7. When the controller 8 detects the difference in the revolutions based on the revolutions signal output from the revolution sensor 33 built into each drive wheel 6, 7 or each driveshaft 30, 31, it computes the driving force that the motor-generators MG1, MG2 must generate, and outputs that to the inverter 16. The inverter 16 generates the necessary electrical power based on the command signal output from the controller 8 and drives each of the sun gears S1, S2 of the differential planetary gear by the motor-generators MG1, MG2.

Figure 5B:
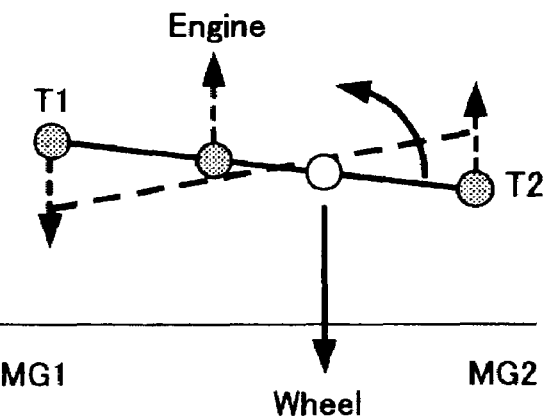

For example, the rear wheels 7 exceed the slip threshold of the tires and the drive drives the motor-generator MG2 by the front wheels 6 whenever necessary, as shown in FIG. 5B, and the driving force of the motor-generator MG1 is generated at a power less than the driving force of the motor-generator MG2, or the motor-generator MG1 acts to regenerate power.

Through this, it is possible to relatively reduce the engine driving force transmitted to the rear wheels 7 through the transmission 3 to the rear wheels 7 by inducing some engine driving force in the differential gear 2, so the momentum works in the direction (counter-clockwise in the diagram) of increasing front-wheel driving force, as shown by the dashed line on the alignment chart in FIG. 5B, thereby making it possible to increase the driving force of the front wheels. The generated torque T2 of the motor-generator MG2 in this case is larger (T2>T1) than the generated torque T1 of the motor-generator MG1.

Furthermore, when totally canceling the driving force of the engine 1 through the torques T1, T2 generated by the motor-generators MG1, MG2 in the differential planetary gear G, or in other words, when inducing all of the driving force of the engine 1 to the differential gear 2, all of the driving force generated by the engine 1 and motor-generators MG1, MG2 can be transmitted to only the front wheels 6, making a full FF drive possible. In this case, a state is achieved in which rotates each change gear of the transmission 3 without transmitting drive torque from the engine 1 and rear wheels 7.

The drive status described above is a case when, as a driving force for the front wheels 6, a part or all of the engine driving force is transmitted to the differential gear 2, but it is also possible to drive the front wheels 6 independently by the motor-generators MG1 and MG2 while maintaining the engine driving force at the rear wheels 7. In other words, as illustrated in FIG. 5B, an alignment chart, by driving the motor-generators MG1 and MG2 in a way to rotate the alignment chart, keeping the engine revolutions in the center, and by increasing only the driving force of the carrier C, it is also possible to drive control the front-wheel-driveline system regardless of the engine driving force with only the driving force generated by the motor-generators MG1 and MG2.

Figure 5C:
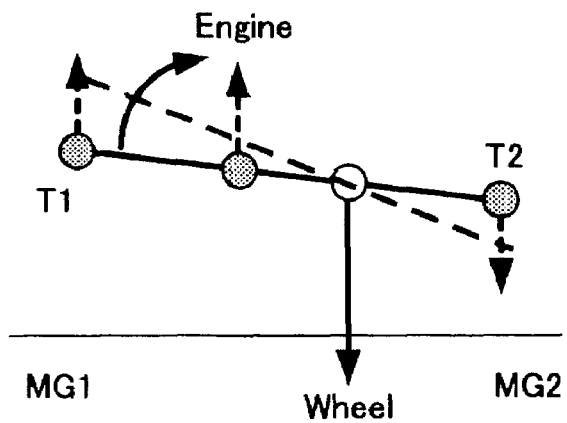

In contrast to FIG. 5B, in the event that the driving force of the engine 1 is insufficient for the driving force of the rear wheels 7, it is also possible to support only the driving force for the rear wheels 7 by driving the motor-generators MG1 and MG2. In other words, in this event, as illustrated in FIG. 5C, an alignment chart, generate larger driving force T1 of the motor-generator MG1 than driving force T2 of the motor-generator MG2, or allow a regeneration operation of the motor-generator MG2. At this moment, each motor-generator MG1 and MG2 carries out a drive or regeneration by accurately controlling the drive distribution ratio and by inhibiting the fluctuation of drive revolutions output from the carrier C to the front wheels 6 to avoid braking effects to the front wheels 6. This becomes feasible when the drive torque T1 and T2 of motor-generators MG1 and MG2 generate a moment at which only the engine driving force increases, keeping the carrier C connected to the front-wheel-driveline system 4 in the center, as illustrated by the dotted line in FIG. 5C, an alignment chart. In this case, it becomes a state in which the total amount of torque from the engine torque and the drive torque of motor-generators MG1 and MG2 can be input into the transmission 3, bypassing the rear driveshaft 20, maintaining the complete FR drive. In this state, the front-wheel-driveline system 4 is rotated without transferring drive torque.

As explained above, with the hybrid four-wheel-drive system in the recent embodiment, front and rear driving force distribution of a vehicle can be arbitrarily controlled by controlling the operational state of motor-generators MG1 and MG2 comprising the differential gear 2. Applied examples in other driving conditions of the hybrid four-wheel-drive system in the present embodiment are explained below.

As an example in which the hybrid four-wheel-drive system in the present invention is applied, if the transmission 3 is a transmission with gears equipped with steps such as gear ratio, the differential gear 2 can be operated in a manner to reduce shock from gear shifts in the transmission 3 by fluctuating only the rear wheel driving force without affecting the front-wheel-driveline system 4. Shock from gear shifts in the transmission 3 is mainly generated when a gear-shift clutch that is concluded after gear shifts is concluded (in the case of an automatic transmission with a planetary gear) and when a power-transfer clutch is re-concluded after being released during gear shifting (in the case of an automatic transmission with a spur gear).

For instance, when the transmission 3 is about to shift up, inertia accompanying reduction of the engine revolutions from the engine 1 attempts to travel to the vehicle. In other words, when the transmission 3 shifts up, a phenomenon occurs in which the inertia from the reduction of revolutions of the engine 1 attempts to accelerate the vehicle. Therefore, by operating motor-generators MG1 and MG2 in order to inhibit the phenomenon, shock from the gear shifts during upshifts can be restrained. To be specific, as illustrated in FIG. 5B, by regenerating the motor-generator MG1 and/or by driving the motor-generator MG2, motor-generators MG1 and MG2 decrease revolutions of the engine 1 while maintaining revolutions of the carrier C without fluctuation to avoid effects such as braking effects on the front-wheel-driveline system 4, so shocks from the gear shifts that may be transmitted to the vehicle can be absorbed.

Furthermore, in contrast, when the transmission 3 is about to shift down, inertia accompanying the acceleration of engine revolutions from the engine 1 attempts to slow to the vehicle because the acceleration of the engine revolutions is required as gear shifts progress creating a phenomenon where the vehicle is attempting to decelerate. Therefore, by operating the motor-generators MG1 and MG2 to inhibit the phenomenon, shocks from the gear shifts during downshifts can be restrained. To be specific, as illustrated in FIG. 5C, by driving the motor-generator MG1 and/or by regenerating the motor-generator MG2, the motor-generators MG1 and MG2 increase revolutions of the engine 1 while maintaining revolutions of the carrier C without fluctuation to avoid effects such as braking effects on the front-wheel-driveline system 4, so shock from the gear shifts that may be transmitted to the vehicle can be absorbed Furthermore, as an example in which the hybrid four-wheel-drive system of the present embodiment is applied during cornering run, the differential gear 2 can be operated to stabilize the behavior of the vehicle. In other words, by locating a G-force sensor 35 around the center of the vehicle, and if the G-force sensor 35 detects cornering G-force exceeding its given value, with an attempt to stabilize the behavior of the vehicle during the cornering run, the torque required for the front wheels 6 is calculated, and also the driving force can be distributed to the front-wheel-driveline system 4 as illustrated in FIG. 5B. In addition, in the front and rear differential gears, by installing limited differentials (LSD) that allow electronically controlled variable changes of the drive distribution ratio of the right and the left wheels, with a combination of the revolution sensor 33 for each wheel and the G-force sensor 35, detecting a status in which the vehicle is about to enter into a spin when accelerated during cornering, by adding a moment that reacts contrary to the vehicle's turning direction, the system can avoid a spin.

For instance, as illustrated in FIG. 6A, when the vehicle is accelerating during a right turn, once the right rear wheel 7 starts sliding due to the excessive driving force, the revolution sensor 33 of the right rear wheel 7 detects the spinning state, and by locking the rear limited differential, the driving force for the left rear wheel axle 31 increases. At the same time, for the purpose of stabilizing the vehicle orientation, following the procedure as illustrated in FIG. 5B, start a drive operation and a regenerative operation of motor-generators MG1 and MG2 to generate power to drive the front wheels 6, bypassing the front-wheel-driveline system 4. When the vehicle orientation gets closer to a spin, as illustrated in FIG. 6B, so as to eliminate a moment of the vehicle that is attempting a right turn, in this case, the integrated control of both motor-generators MG1 and MG2 and the front limited differential can increase the driving force for the right front wheel 6. This makes stable cornering possible without losing the driving force of the engine 1 and the motor-generators MG1 and MG2.

Figure 7A:
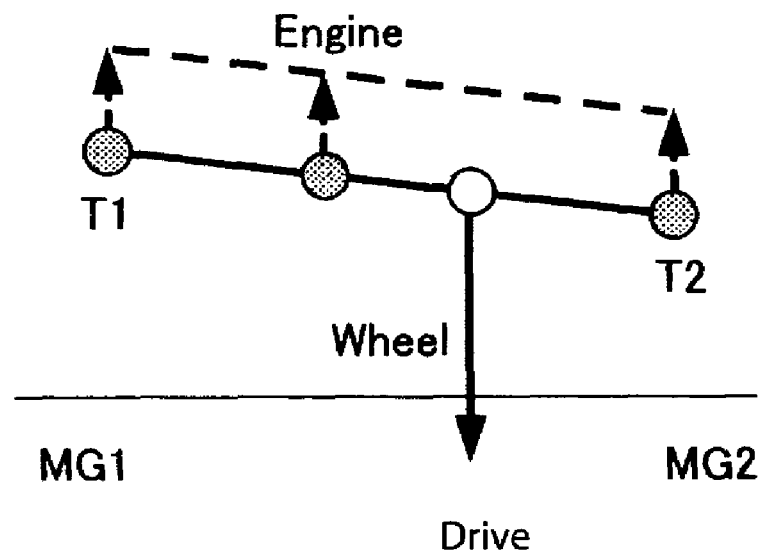
FIG. 7 is a diagram to explain drive operation (A) and regeneration operation (B) by motor-generators.
Figure 7B:
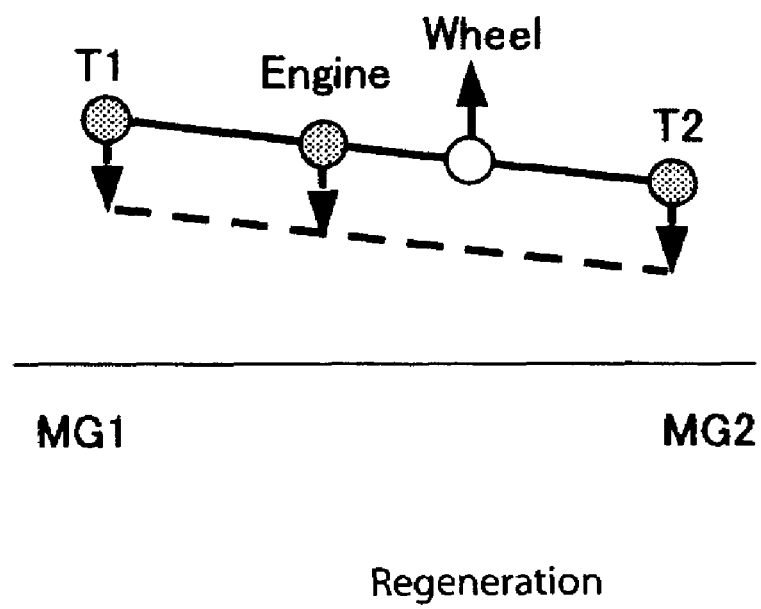

Furthermore, as an example in which the hybrid four-wheel-drive system in the present embodiment is applied, hybrid driving can be realized, focusing on fuel economy: as illustrated in FIG. 7A when accelerating, by driving both motor-generators MG1 and MG2, while maintaining balance to maintain the gear ratio determined by the transmission 3, and as illustrated in FIG. 7B, when decelerating, by regenerating both motor-generators MG1 and MG2, while maintaining balance to maintain the gear ratio determined by the transmission 3. Moreover, when the state of charge (SOC) of the battery 17 becomes low, it is also possible to run the vehicle while charging by allowing relatively more regeneration of the motor-generator MG1 while driving the motor-generator MG2, thus applying load on the engine 1.

In this hybrid driving, unlike a conventional example in which energy is needed for both motor-generators to drive and to regenerate while circulating power to maintain the gear ratio is no longer required when driven by only the rear wheels, so compared to the conventional example, a further enhancement of fuel economy becomes possible. In addition, for the same reason driving force that can be driven and regenerated by motor-generators MG1 and MG2 can surpass that of a conventional example. Moreover, in the conventional example, because insufficient driving force was generated while maintaining the gear ratio at a low speed, a low-mode was set to create the gear ratio mechanically by securing a ring gear R to the brake, for which a multi-plate wet clutch and a hydraulic pump were required to be installed in the differential gear 2, but with this hybrid four-wheel-drive system in the present embodiment, as the transmission 3 handles the low-mode function, the wet clutch and hydraulic pump are not required in the differential gear 2, so the device can be simplified.

Furthermore, as an example in which the hybrid four-wheel-drive system of the present embodiment is applied, by installing a clutch 15 between the engine 1 and the differential gear 2 to cut off power transfer, with the driving force from the engine 1 being cut off by the clutch 15, it is also possible to make the motor-generators MG1 and MG2 run the vehicle forward and backward by driving the front wheels 6.

In other words, at an extremely low speed, by stopping the engine 1 and by driving the front-wheel-driveline system 4 (EV driving) with the motor-generators MG1 and MG2, as in a regular transmission, the number of initial components (torque converter or fiction clutch) to be installed in the transmission 3 can be reduced. Moreover, idling of the engine 1 can be stopped, thus realizing a further enhancement of fuel economy. In short, because power transfer with the engine can be cut off by the clutch 15 to cut off the power transfer installed between the differential gear 2 and the engine, when the revolution is low, the drive wheel does not need to perform a power transfer from the engine if the front-wheel-driveline system 4 (EV driving) is driven with the motor-generators MG1 and MG2 when starting, so the number of initial components in the transmission can be reduced. Furthermore, as the motor-generators MG1 and MG2 can reverse rotational direction, in the event of EV driving by front-wheel-drive while the engine is stopped, reverse travel also becomes possible, so the forward/reverse switch mechanism in the transmission 3 required for reverse travel by the engine drive can be eliminated, thus a transmission 3 can be simplified.

Moreover, if an electric hydraulic pump is installed independently in the transmission 3, because of the oil pressure of electric pumps 22 and 23 the power is transferable at the transmission 3 even while the engine is stopped, also during an EV driving by the front-wheel-drive a four-wheel-drive becomes possible with the addition of a rear-wheel-drive.

Figure 8:
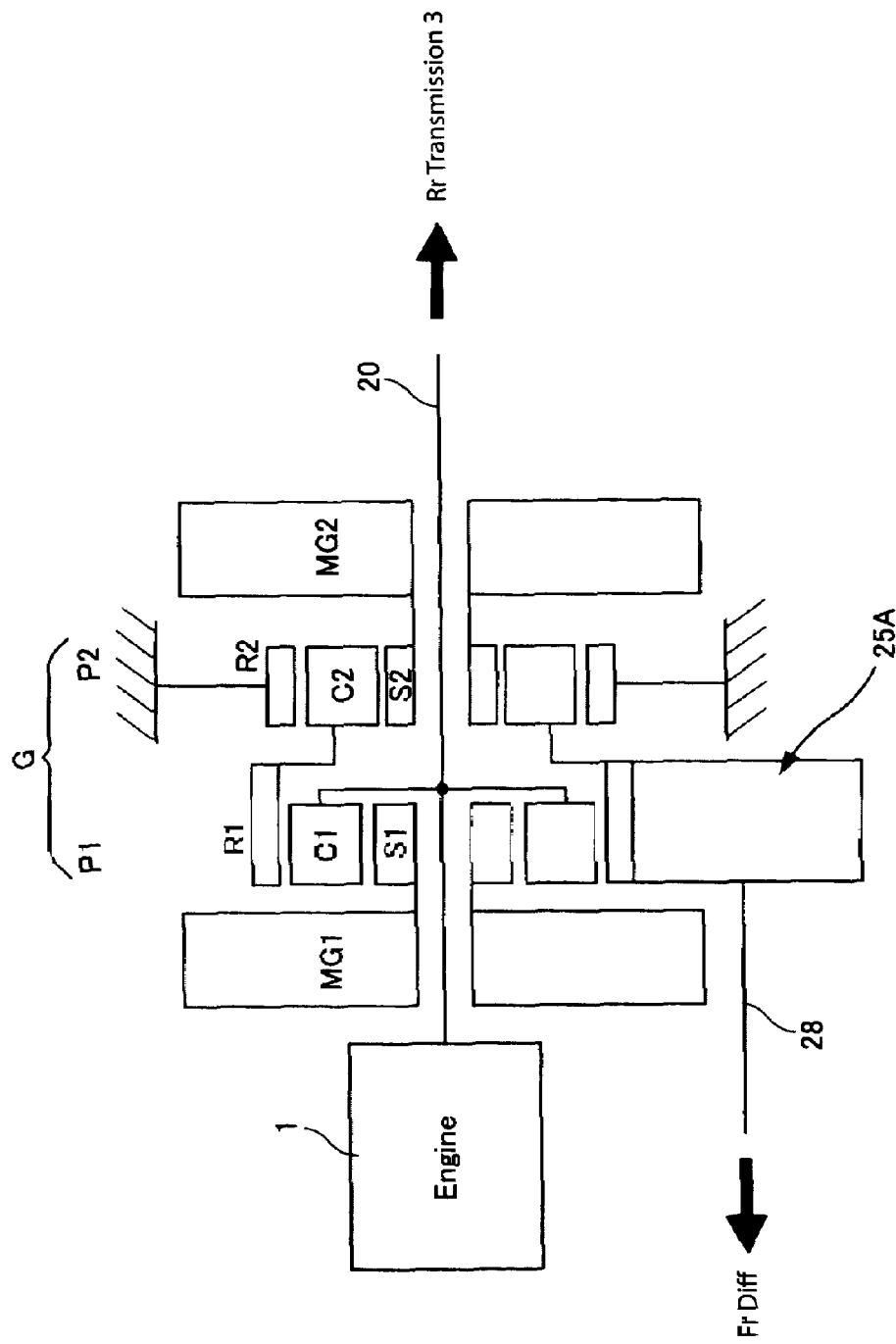
FIG. 8 is a block diagram to explain a second exemplary embodiment of a differential gear in a hybrid four-wheel-drive system.

FIG. 8 is a diagram of a gear train illustrating the second exemplary embodiment of the differential gear 2 in a hybrid four-wheel-drive system. In the present embodiment, the differential gear 2 is comprised of two steps of single pinion planetary gears G in place of Ravigneaux differential planetary gears. Furthermore, for a device that is identical to the one in FIG. 1, explanations are either omitted or simplified by marking the identity.

In FIG. 8, the differential gear 2 is the same as in the first exemplary embodiment comprising of more than two motor-generators MG1 and MG2, and of a differential planetary gear assembly G that can variably control the drive output to the front-wheel-driveline system 4 and/or to the rear-wheel-driveline system 5 according to the driving force from the engine 1 and the driving force of motor-generators MG1 and MG2. The differential planetary gear assembly G is comprised of two steps of single pinion planetary gears P1 and P2. In other words, a ring gear R1 of the first planetary gear train P1 and a carrier C2 of the second planetary gear train P2 are connected to each other, and a ring gear R1 of the first planetary gear train P1 is connected to the front-wheel-driveline system 4, engaging with a gear 25A for the front-wheel-drive on the outer circumference. The ring gear R2 of the second planetary gear train P2 is secured to the case, the motor-generator MG1 is connected to a sun gear S1 of the first planetary gear train P1, and the motor-generator MG2 is connected to a sun gear S2 of the second planetary gear train P2. The driving force from the engine 1 is input to a carrier C1 of the first planetary gear train P1. At the same time, the output from the engine 1 passes through the differential gear 2 bypassing the driveshaft 20, and then outputs to the transmission 3 located in the rear part of the vehicle.

Figure 9:
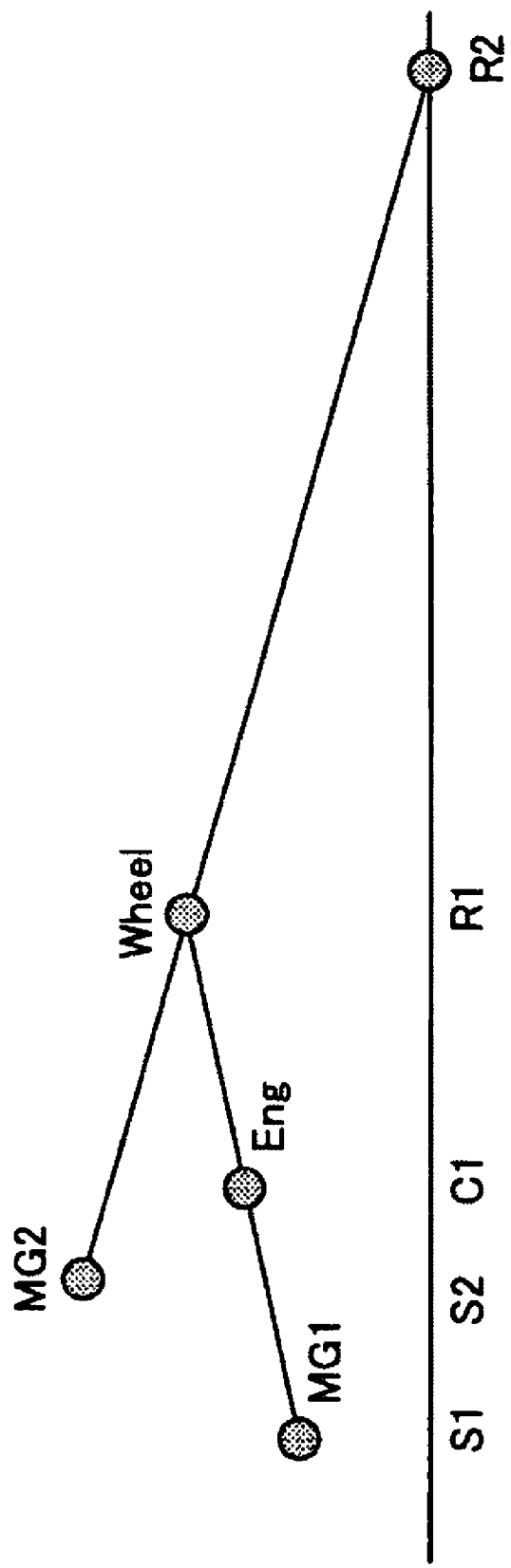
FIG. 9 is an alignment chart of a differential gear in FIG. 8.

FIG. 9 illustrates an alignment chart of the differential planetary gear assembly G and is configured as follows: a straight line comprising the first planetary gear train P1 and a straight line comprising the second planetary gear train P2 are connected by the ring gear R1 of the first planetary gear train P1 and the carrier C2 of the second planetary gear train P2 while a ring gear R2 of the second planetary gear train P2 is fixed at zero revolutions. Furthermore, with this differential planetary gear assembly G, once the revolutions of either of two components is determined, the revolutions of the remaining components, or in other words, the revolutions of all of the components can be primarily determined, creating a relation. Moreover, the drive torque of the motor-generator MG2 enters into the ring gear R1 of the first planetary gear train P1 after being amplified by the second planetary gear train P2, thus contributing to the larger drive output of the differential gear 2.

In addition, in the differential gear 2 of this configuration, similar to the differential gear 2 shown in FIGS. 1 and 2, the transmission 3 determines the relation between the engine 1 and the revolutions of the wheels 6 and 7, in accordance with the percentage of the drive and the regeneration of each motor-generator MG1 and MG2, front and rear driving force distribution of a vehicle can be arbitrarily controlled from being 100% driven by the front wheels to 100% driven by the rear wheels variably. Therefore, as in the first exemplary embodiment, control of the front and rear driving force distribution allows a reduction operation of shocks accompanying the gear shifts in the transmission 3, a stabilization operation of vehicle behaviors during cornering travel, driving at a modest speed in fuel economy mode, and EV driving operation.

Furthermore, with this differential gear 2, in order to conclude the ring gear 1 of the first planetary gear train P1 and the carrier C2 of the second planetary gear train P2, a clearance to conclude the first and the second planetary gear trains is required. As a result, the length of an axle of the differential gear 2 becomes longer, but consisting only of a single pinion, the number of part items can be reduced in contrast to the Ravigneaux differential planetary group, which is comprised of double pinion and single pinion, requiring a larger number of part items.

Figure 10:
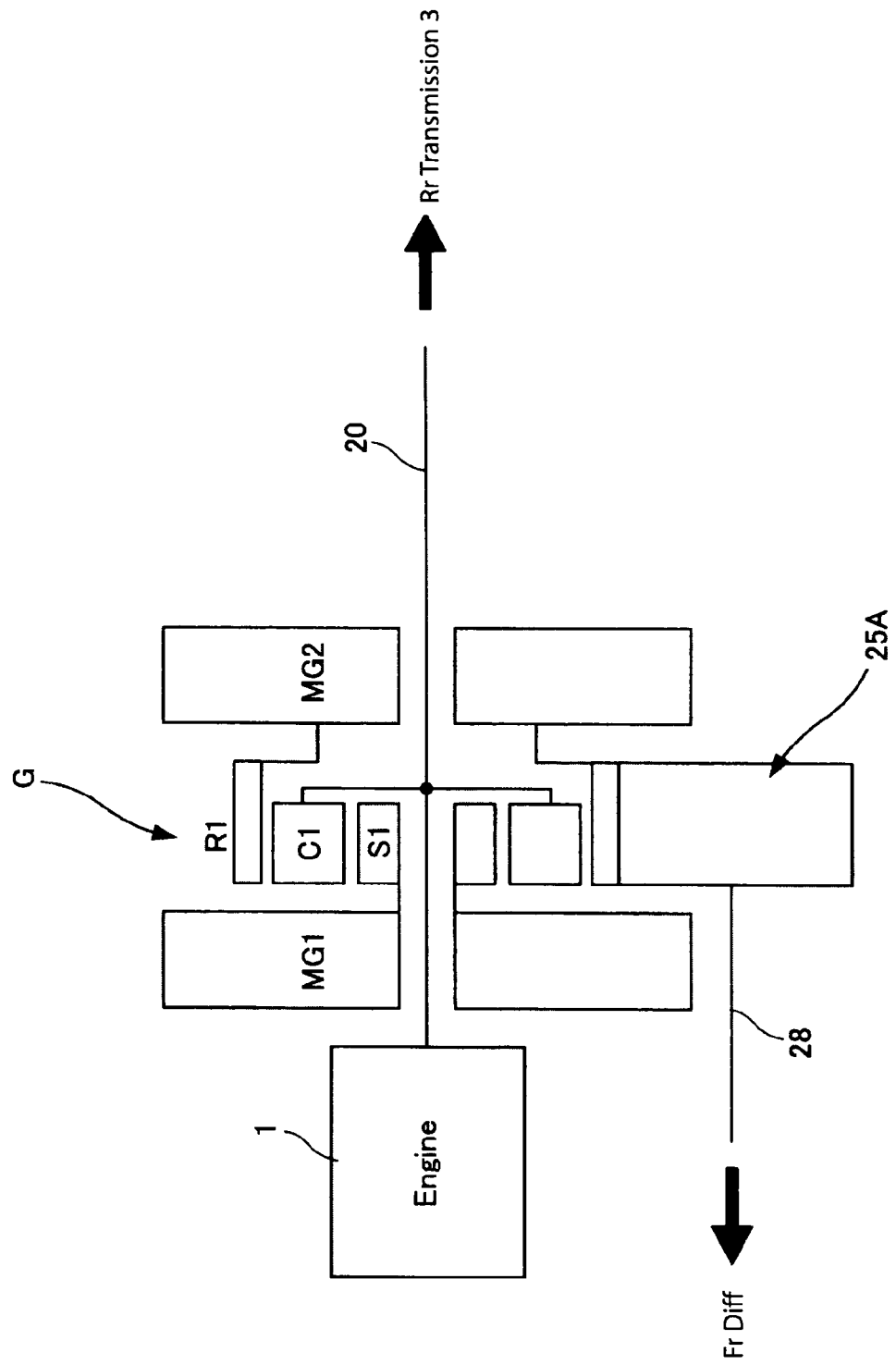
FIG. 10 is a block diagram to explain a third exemplary embodiment of a differential gear in a hybrid four-wheel-drive system.

FIG. 10 is a diagram of a gear train illustrating the third exemplary embodiment of the differential gear in a hybrid four-wheel-drive system. In the present embodiment, the differential gear 2 is comprised of a train of single pinion planetary gear assembly G. Furthermore, for a device that is identical to the one in FIG. 1 explanations are either omitted or simplified by marking the identity.

In FIG. 10, the differential gear 2 is the same as the first exemplary embodiment in terms of comprising of more than two motor-generators MG1 and MG2, and of a differential planetary gear assembly G that can variably control the drive output to the front-wheel-driveline system 4 and/or to the rear-wheel-driveline system 5 according to the driving force from the engine 1 and the driving force of motor-generators MG1 and MG2. The differential planetary gear assembly G is comprised of a step of single pinion planetary gears. In other words, a ring gear R1 of the planetary gear train is connected to the front-wheel-driveline system 4, engaging with a gear 25A for the front-wheel-drive on the outer circumference and is also connected to the motor-generator MG2. The motor-generator MG1 is connected to a sun gear S1 in the planetary gear train, and the driving force from the engine 1 is input to the carrier C1 of the planetary gear train. At the same time, the output from the engine 1 passes through the differential gear 2, bypassing the driveshaft 20, and then outputs to the transmission 3 located in the rear part of the vehicle.

Figure 11:
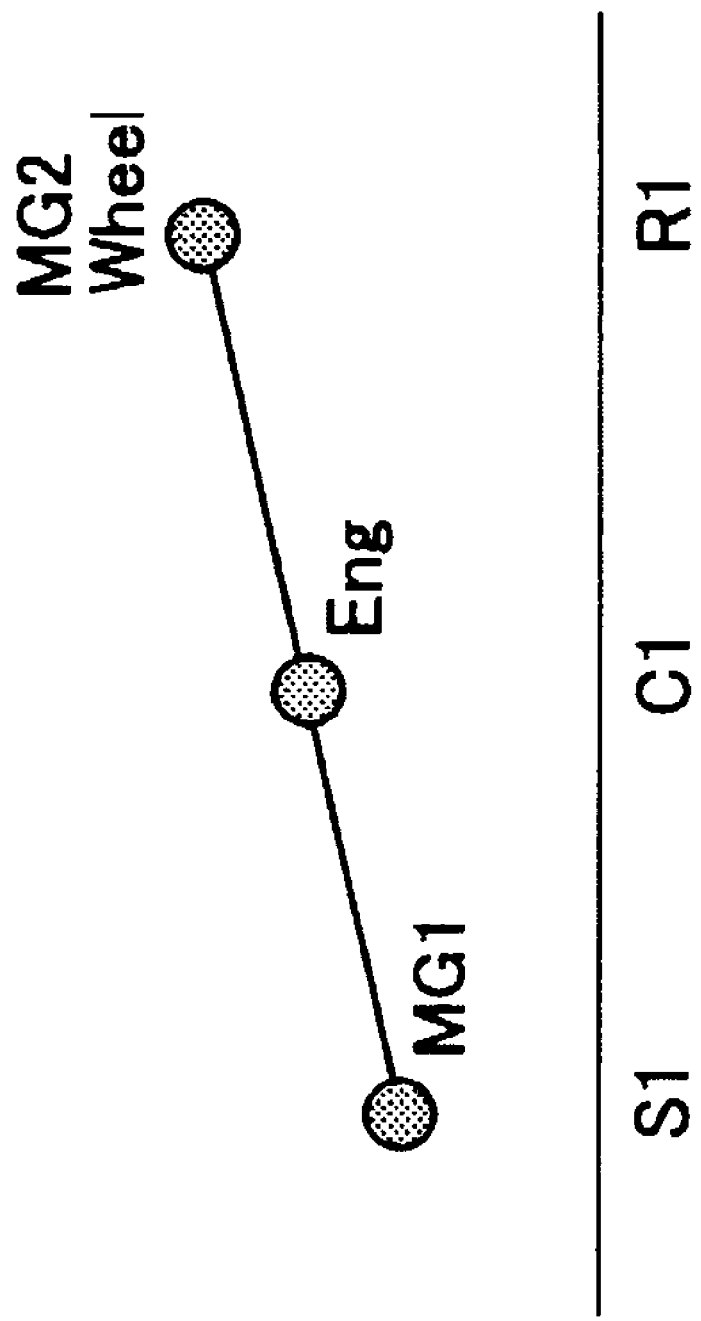
FIG. 11 is an alignment chart of a differential gear in FIG. 10.

FIG. 11 illustrates an alignment chart of the differential planetary gear assembly G comprising the above differential gear 2. Once revolution speeds for any two components is determined, the revolution speeds of the remaining components, or in other words, revolutions of all of the components can be primarily determined creating a relation. Furthermore, the drive torque of the motor-generator MG2 enters straight into the ring gear R1 of the planetary gear train G without being amplified, thus requiring higher torque generated by the motor-generator MG2 itself. A hybrid four-wheel-drive system equipped with such a differential gear 2 is applicable to vehicles with small torque capacity to be distributed to the front wheels 6.

Because the number of planetary gear steps can be reduced down to one step with the differential gear 2 in this configuration, the configuration can be simplified. Furthermore, as the motor-generator MG2 is directly concluded at the ring gear R1, which is directly connected to the front-wheel-driveline system 4, the power loss between the front wheels 6 and the motor-generator MG2 remains low, so drive and regeneration efficiency can be enhanced.

The present invention can demonstrate the following effects.

(a) At a reasonable cost, it is possible to configure and provide a hybrid four-wheel-drive system equipped with a differential gear 2 that is comprised of more than three output components and allocates the components: input from the engine 1 to one of the components, output to the driveline system 4 for the front wheels 6 or for the rear wheels 7 to one of remaining components, and each motor-generator MG1 and MG2 to two components, including the remaining components, and with a transmission 3 that outputs and shifts revolutions of components input from the engine 1 of the differential gear 2 without bypassing the differential gear 2 to the driveline system 5 for the rear wheels 7 or for the front wheels 6, the plurality of motor-generators MG1 and MG2 of the differential gear 2 can increase or decrease drive torque to the rear wheels 7 independently from torque to the front wheels 6 if the controller 8 as a control means controls engine torque input to the differential gear 2 to be increased or decreased without changing the drive wheel torque output from the differential gear 2.

Additionally, the plurality of motor-generators MG1 and MG2 of the differential gear 2 can increase or decrease drive torque to the front wheels 6 independently from torque to the rear wheels 7 if the controller 8 as a control means controls the drive wheel torque output from the differential gear 2 to be increased or decreased without changing the engine torque input to the differential gear 2.

Subsequently, by combining both conditions described above, the torque distribution ratio of the front and rear wheels 6 and 7 can be variably controlled from 0:100 to 100:0, thereby improving the controllability of four-wheel-drive vehicles.

Furthermore, as the differential 2 does not need to maintain the gear ratio electronically, power circulation between the motor-generators MG1 and MG2 is reduced, so electric efficiency can be enhanced. Therefore, despite diverting use of a hybrid unit for FF, fuel economy can be enhanced and higher power torque can be generated in comparison to electric gear shifts.

(b) Moreover, by installing a means to detect 33 the slippage ratio of tires on the front wheels 6 and on the rear wheels 7, when the tire slippage ratio of the front wheels 6 or of the rear wheels 7 is detected, allow the controller 8 as a control means to drive the motor-generators MG1 and MG2 according to the slippage ratio, and then the driving force of the engine 1 and the motor-generators MG1 and MG2 can be freely distributed to the front and the rear wheels 6 and 7, thereby stabilizing the vehicle orientation and enhancing the driving performance.

(c) The differential gear 2, as illustrated in FIG. 2, is comprised of four elements arrayed on the alignment chart shown in FIG. 4. These first to fourth elements of differential gear 2 are in order—first to fourth on the alignment chart and respectively connected to an engine 1 input revolution, drive output revolution, motor-generator MG1, and a motor-generator MG2. In this manner, the first and second elements, which are connected to engine 1 input revolution and drive output revolution respectively, are between the third and fourth elements, which are connected to motor-generator MG1, and motor-generator MG2 respectively, on the alignment chart. Differential gear 2 restrains the torque passing through the motor-generators MG1 and MG2 and at the same time amplifies the output torque of the motor-generators MG1 and MG2, so the motors MG1 and MG2 to be installed can be downsized.

(d) It is possible to construct a hybrid four-wheel-drive system and provide it at an affordable price without the necessity of any specialized design of the transmission, hybrid unit, differential, etc., simply by adding a hybrid unit for the FF of a front-engine-front-wheel drive vertically to the FR platform of a front-engine-rear-wheel drive in a transaxle layout in which the transmission 3 and the rear-wheel axle device 5 are integrated.

(e) If the controller 8 as a control means controls at least one motor-generator MG1 or MG2 to drive and regenerate at a time when gear shifts take place in the transmission 3 without changing the driving force output from the differential gear 2, shock accompanying gear shifts can be restrained in the event that the transmission 3 is a transmission with steps. In this case, spike-like torque is generated by the drive and by the regeneration of the motor-generators MG1 and MG2 so that the engine torque being input to the transmission 3 decreases during a variable increase and the engine torque being input to the transmission 3 increases during a variable decrease.

(f) With the differential gear 2, if the clutch 15 is installed in a space between the engine 1, by allowing the clutch 15 to cut off the differential gear 2 from the engine 1, idling can be stopped, and EV driving as well as reverse travel becomes possible. Consequently, the number of initial components can be reduced, such as torque converter, etc., thus simplifying the structure. As for the transmission 3, the forward/reverse switch mechanism can be eliminated, and at the same time, effects from stopping idling and EV driving can enhance fuel economy.

(g) By driving the pump 22 that generates an oil pressure source for operations of the transmission 3 with the electric motor 23, the drive and regeneration for all four wheels become possible even during EV driving as well as the reverse travel described in the effects (f).

(h) Furthermore, by installing the acceleration sensor 35 near the center of the vehicle, based on output from the acceleration sensor 35, if the controller 8 as a control means operates motor-generators MG1 and MG2 to control the drive distribution to the front and the rear wheels 6 and 7, vehicle orientation that tends to become unstable during cornering of the vehicle can be actively controlled and stabilized.

Figure 12:
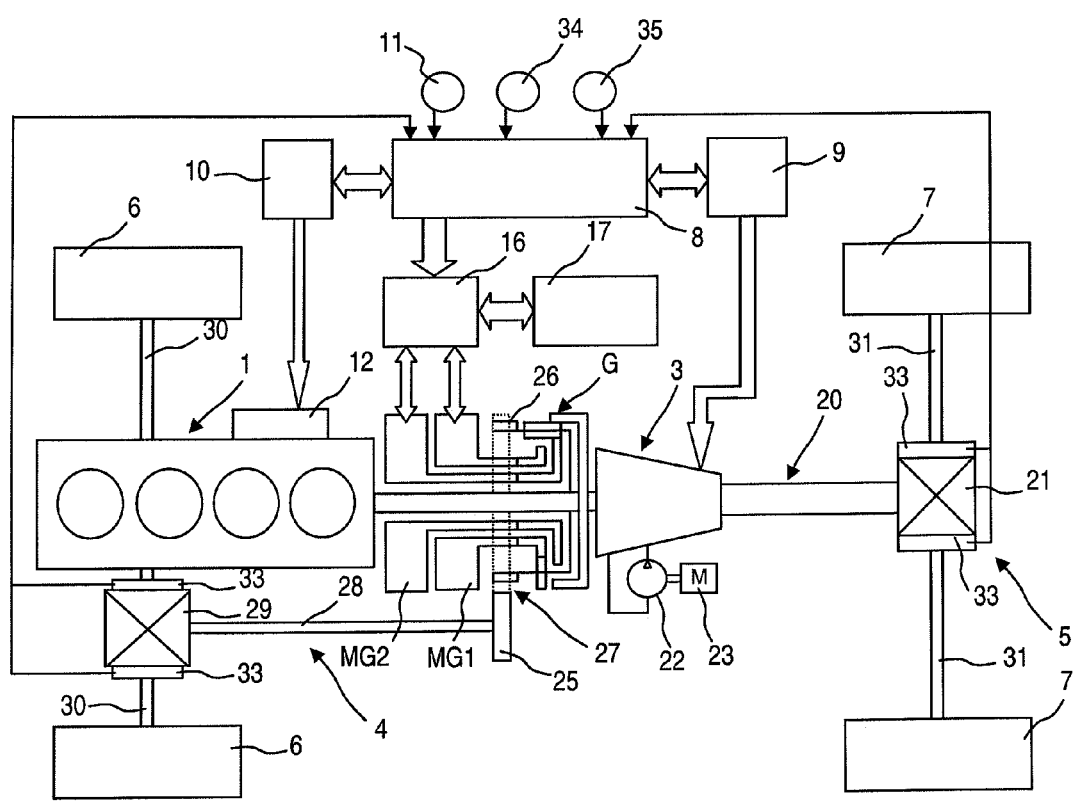
FIG. 12 is a block diagram of a hybrid four-wheel-drive system with a transmission installed in the front rather than the rear.

Furthermore, in the embodiment shown in FIG. 1, an illustration was given for a four-wheel-drive system in which the engine 1 and the differential gear 2 are installed in the front and the transmission 3 is installed in the rear. Other than (d), the benefits can be still achieved even though the transmission 3 is installed in the front as in FIG. 12. However, with regards to effect (c), the torque passing through the differential gear 2 becomes greater compared to that in the embodiment of FIG. 1 due to amplification of the torque by the transmission 3, so the motors MG1 and MG2 become bigger.

Figure 13:
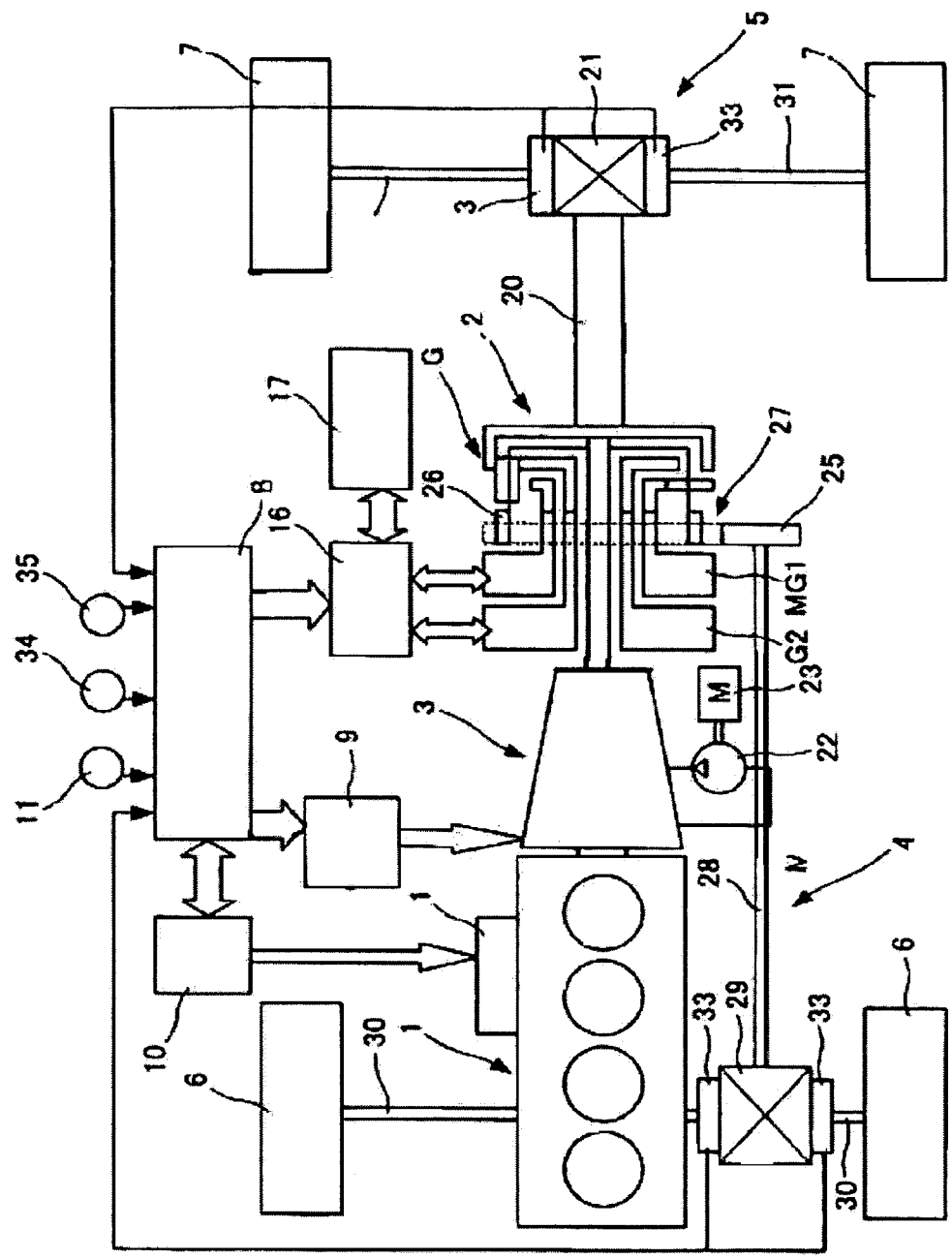
FIG. 13 is a block diagram of a hybrid four-wheel-drive system where the order of a transmission and differential gear are switched as compared to the embodiment shown in FIG. 1.

Effects (e) and (f) can still be achieved even when the order of the transmission 3 and the differential gear 2 are switched as in FIG. 13. Explanations were given regarding a four-wheel-drive system in which the rear wheels 7 are driven by the transmission 3 output while the front wheels 6 are driven by the output of the differential gear 2. Although not illustrated, this can be a four-wheel-drive system in which the front wheels 6 are driven by the transmission output, while the rear wheels 7 are driven by the output of the differential gear.

Various embodiments of the invention have been described.

These and other embodiments are within the scope of the following claims.

The invention claimed is:

1. A drivetrain for a vehicle comprising:
   a first driveline system including one of front wheels or rear wheels;
   a second driveline system including the other of the front wheels and the rear wheels;

a differential gear mechanism including rotational elements having
> a first rotational element configured to receive power from an engine and directly output the power from the engine to the first driveline system,
> a second rotational element configured to input power from a first motor-generator, and
> a third rotational element configured to input power from a second motor-generator, one of the rotational elements of the differential gear mechanism other than the first rotational element being configured to output power to the second driveline system; and a controller configured to adjust power outputs to the first driveline system and the second driveline system.

2. The drivetrain of claim 1, wherein
the controller adjusts the power outputs to the first driveline system and the second driveline system by adjusting power output of the engine, power output of the first motor-generator, and power output of the second motor-generator.

3. The drivetrain of claim 1, wherein
the first driveline system includes a transmission.

4. The drivetrain of claim 3, wherein
the first driveline system includes rear wheels, and
the transmission is located near a rear axle corresponding to the rear wheels.

5. The drivetrain of claim 3, wherein
the controller reduces power output to the first driveline system when gear shifts take place in the transmission without changing power output to the second driveline system.

6. The drivetrain of claim 1, wherein
the one of the rotational elements of the differential gear mechanism that outputs power to the second driveline system includes one of the second rotational element and the third rotational element.

7. The drivetrain of claim 1, wherein
the rotational elements of the differential gear mechanism are aligned on an alignment chart.

8. The drivetrain of claim 1, wherein
the first driveline system includes the front wheels, and
the second driveline system includes the rear wheels.

9. The drivetrain of claim 1, wherein
the controller receives an input representing a slippage ratio of the front and rear wheels and adjusts the power outputs to the first driveline system and the second driveline system by adjusting power output to one of the first and second motor-generators according to the slippage ratio.

10. The drivetrain of claim 1, wherein
the controller adjusts the first and second motor-generators to increase or decrease power output from the engine to the differential gear without changing power output from the differential gear, and
the power output from the differential gear mechanism includes the power outputs to the first and second driveline systems.

11. The drivetrain of claim 1, wherein
the controller adjusts the first and second motor-generators to increase or decrease power output from the differential gear mechanism without changing power output from the engine to the differential gear.

12. The drivetrain of claim 1, wherein
the differential gear mechanism further includes a clutch connected to the first element.

13. The drivetrain of claim 1, wherein
the differential gear mechanism drives a pump that generates an oil pressure source.

14. The drivetrain of claim 1, wherein
the controller operates the first and second motor-generators to control the distribution of power output to the front and rear wheels based on data from an acceleration sensor in the vehicle.

15. The drivetrain of claim 1, wherein
the third rotational element outputs power to the second driveline system.

16. The drivetrain of claim 15, wherein
the rotational elements are in the following order on an alignment chart:
the second rotational element,
the first rotational element, and
the third rotational element.

17. The drivetrain of claim 1, wherein
the one of the rotational elements of the differential gear mechanism that outputs power to the second driveline system includes a fourth rotational element.

18. The drivetrain of claim 17, wherein
the rotational elements are in the following order on an alignment chart:
the second rotational element,
the first rotational element,
the fourth rotational element, and
the third rotational element.

19. The drivetrain of claim 17, wherein
the differential gear mechanism further includes
a housing member, and
a fifth rotational element connected to the housing member.

20. The drivetrain of claim 1, wherein
the controller is further configured to selectively allocate drive power among the first driveline system and the second driveline system at any ratio between 0:100 and 100:0 inclusive.

21. The drivetrain of claim 1, wherein
the first driveline system and the second driveline system input power to the differential gear mechanism, and
the controller transfers the input power to one or more of the motor-generators during regenerative braking of the vehicle.

22. The drivetrain of claim 1, wherein
the differential gear mechanism includes a planetary gear mechanism.

23. The drivetrain of claim 1, wherein
the first rotational element is further configured to receive the power from the engine and directly output the power from the engine to the first driveline system with bypassing the second and third rotational elements.

* * * * *